US009369293B2

(12) United States Patent
Li (10) Patent No.: US 9,369,293 B2
(45) Date of Patent: Jun. 14, 2016

(54) COMPRESSING SINGLY LINKED LISTS SHARING COMMON NODES FOR MULTI-DESTINATION GROUP EXPANSION (71) Applicant: Cisco Technology, Inc., San Jose, CA (US)

(72) Inventor: Mingzhe Li, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 13/894,484

(22) Filed: May 15, 2013

(65) Prior Publication Data
US 2014/0071988 A1 Mar. 13, 2014

(51) Int. Cl.
H04L 12/18 (2006.01)
G06F 3/0484 (2013.01)
G06T 11/60 (2006.01)
H04L 12/931 (2013.01)
H04L 12/761 (2013.01)

(52) U.S. Cl.
CPC .............. H04L 12/18 (2013.01); G06F 3/0484 (2013.01); G06T 11/60 (2013.01); H04L 49/201 (2013.01); H04L 45/16 (2013.01)

(58) Field of Classification Search
CPC ................................ H04L 12/26; H04L 27/28
USPC .......................................................... 370/390
See application file for complete search history.

(56) References Cited

U.S. PATENT DOCUMENTS 5,592,476 A 1/1997 Calamvokis et al.
6,643,706 B1* 11/2003 Marques et al. .............. 709/242
6,839,348 B2 1/2005 Tang et al.
7,000,234 B1* 2/2006 Shavit et al. .................. 719/315
7,117,273 B1 10/2006 O'Toole et al.
7,185,077 B1 2/2007 O'Toole et al.
7,334,048 B1* 2/2008 Guan et al. .................... 709/242
8,250,359 B2 8/2012 Weis et al.
8,259,612 B2* 9/2012 Cai et al. ....................... 370/254

(Continued)

FOREIGN PATENT DOCUMENTS

WO 03069509 A2 8/2003

OTHER PUBLICATIONS

Briscoe, Neil, Understanding the OSI 7-Layer Model, Jul. 2000, PC Network Advisor, Issue 120, pp. 13-14.*

(Continued)

Primary Examiner — Noel Beharry
Assistant Examiner — Rodrick Mak
(74) Attorney, Agent, or Firm — Edell, Shapiro & Finnan, LLC (57) ABSTRACT A multi-destination expansion table is stored that comprises a first database containing data representing all nodes in a singly linked list that is a superset of nodes for a plurality of multi-destination groups and a second database storing data representing multi-destination group specific arcs across one or more nodes. The singly linked list is traversed to determine how to replicate a packet for a particular multi-destination group. The packet is replicated based on interface data stored in the first database associated with the current node address. When a match is found in the second database, a next node address is determined from the second database. When a match is not found in the second database, a next node address determined from accessing the first database. Traversing of the singly linked list is terminated when the next node address is determined to be invalid or null.

21 Claims, 8 Drawing Sheets

(56) References Cited

U.S. PATENT DOCUMENTS

| | | |
|---|---|---|
| 8,611,270 B1 * | 12/2013 | Sapkota et al. ............... 370/312 |
| 2002/0048278 A1 * | 4/2002 | Krishnakumar et al. ..... 370/412 |
| 2004/0042478 A1 | 3/2004 | Bertagna |
| 2004/0081154 A1 | 4/2004 | Kouvelas |
| 2007/0195761 A1 | 8/2007 | Tatar et al. |
| 2007/0195778 A1 | 8/2007 | Tatar |
| 2007/0258454 A1 | 11/2007 | Wijnands et al. |
| 2009/0122732 A1 | 5/2009 | Brockners et al. |
| 2009/0268731 A1 | 10/2009 | Narayanan et al. |
| 2010/0118754 A1 | 5/2010 | Burton et al. |
| 2012/0294309 A1 | 11/2012 | Cai et al. |
| 2013/0021942 A1 | 1/2013 | Bacthu et al. |

OTHER PUBLICATIONS

International Search Report and Written Opinion in counterpart International Application No. PCT/US2014/038906, mailed Aug. 11, 2014, 11 pages.

\* cited by examiner

FIG.2

MET TABLE 100

PRIMARY NODE
INFORMATION BASE
(PRIB) 110

| 112 ADDRESS | 114 INTERFACE ID | 116 NEXT ADDRESS |
|---|---|---|
| B1 | 1 | B2 |
| B2 | 2 | B3 |
| B3 | 3 | B4 |
| B4 | 4 | B5 |
| B5 | 5 | NULL |

PHANTOM NODE
INFORMATION BASE
(PHAB) 120

| ADDRESS | 122 GROUP ID (KEY) | 124 CURRENT PRIB ADDRESS (KEY) | 126 NEXT PRIB ADDRESS (DATA) |
|---|---|---|---|
| G1-1 | GROUP 1 | B1 | B3 |
| G2-1 | GROUP 2 | B4 | NULL |
| G3-1 | GROUP 3 | B3 | B5 |

COMPRESSING SINGLY LINKED LISTS SHARING COMMON NODES FOR MULTI-DESTINATION GROUP EXPANSION

TECHNICAL FIELD

The present disclosure relates to replicating packets for network applications.

BACKGROUND

A singly linked list is a common data structure in computer science. It consists of a group of nodes, which together represent a sequence. Every node comprises a data field and a reference to the next node.

One example application in networking is multi-destination group expansion in a Multi-Destination Expansion Table (MET). For example, to distribute a packet to a list of outgoing interfaces belonging to an Internet Protocol (IP) multicast group, a linked list of nodes is traversed and a copy of the packet is transmitted out of the interface represented by each node in the list.

DESCRIPTION OF EXAMPLE EMBODIMENTS

Overview

Presented herein are techniques for iteratively replicating packets when expanding a multi-destination group. A multi-destination expansion table is stored that comprises a first database and a second database. The first database contains data representing all nodes in a singly linked list that is a superset of nodes for a plurality of multi-destination groups. Each node represents an interface of a physical or virtual network device and each entry in the first database comprises interface data associated with a current node address and an address for a next node in the singly linked list. The second database stores data representing multi-destination group specific arcs bypassing one or more nodes in the first database. The singly linked list is traversed to determine how to replicate a packet for a particular multi-destination group by accessing the first database using a current node address to determine a next node address and to determine interface data associated with the current node address, and searching the second database using a key based on a group identifier for a subset of the plurality of nodes in the singly linked list to determine whether a match to the key exists in the second database. The packet is replicated based on interface data stored in the first database associated with the current node address. When a match is found in the second database, a next node address for a node in the first database is determined from a matching entry to the key in the second database. When a match is not found in the second database, a next node address for a node in the first database is determined from accessing the first database.

Example Embodiments

Techniques are presented herein to achieve a theoretical best compression of a group of singly linked lists with common nodes. Uses of these techniques include multi-destination group expansion and other network applications involving linked lists, in both hardware and software implementations.

Figure 1:
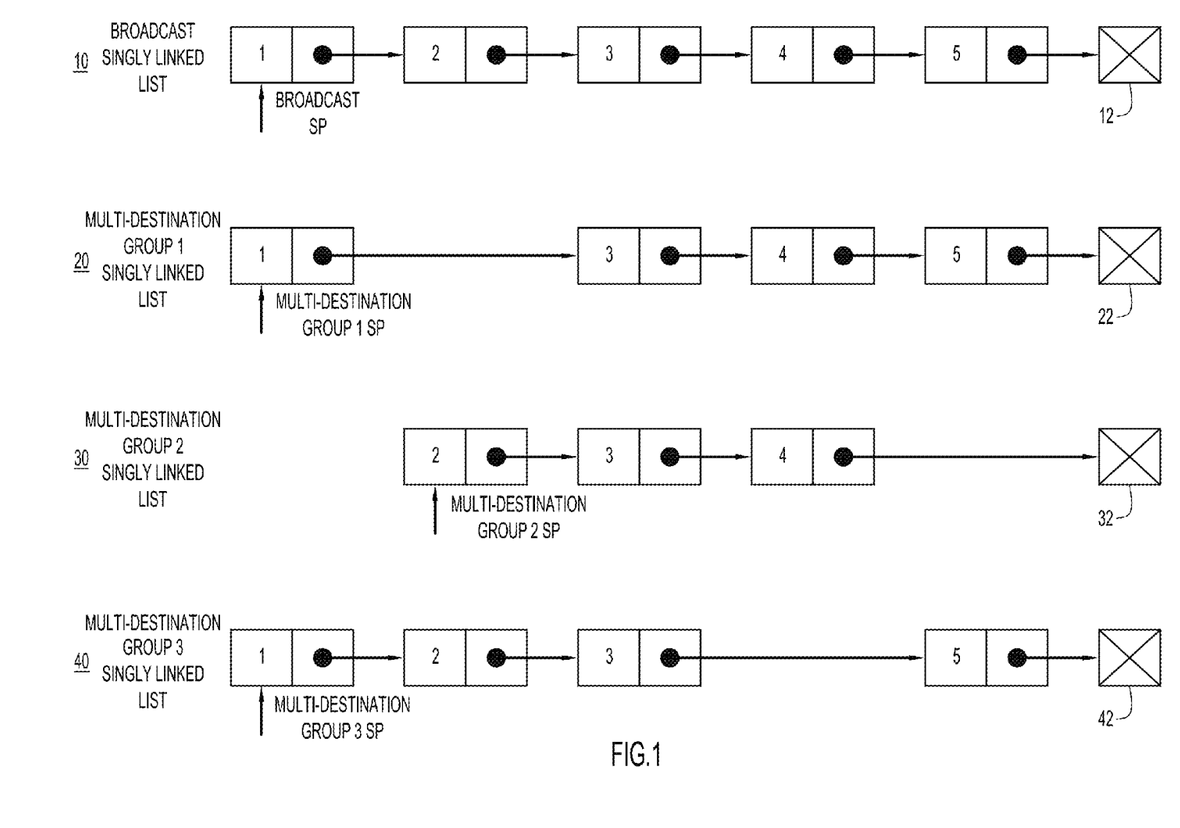
FIG. 1 is a diagram showing several singly linked lists that have nodes in common, and for which a compressed singly linked list is created according to the techniques presented herein.

Referring first to FIG. 1, a diagram is shown of several singly linked lists, including a singly linked list 10 that is a superset of nodes for a plurality of multi-destination groups. The list 10 is also referred to as a broadcast singly linked list because, as will become apparent hereinafter, it includes all of the nodes for a plurality of multi-destination groups. Each of the multi-destination groups comprises a subset of the nodes in list 10. Specifically, and by way of example only, there is Multi-Destination Group 1 defined by singly linked list 20, Multi-Destination Group 2 defined by singly linked list 30, and Multi-Destination Group 3 defined by singly linked list 40. As is known in the art, a singly linked list consists of a group of nodes, which together represent a sequence. Every node comprises a data field and a reference to the next node.

The superset singly linked list 10 comprises a sequence of nodes numbered 1, 2, 3, 4 and 5, where node 1 goes to node 2, node 2 goes to node 3, node 3 goes to node 4 and node 4 goes to node 5. List 10 ends with null or invalid node 12. List 10 is the default case where all nodes are traversed in sequence. The start pointer (SP) for the broadcast singly linked list 10 is node 1. Each node in the singly linked lists shown in FIG. 1 may represent an interface and/or associated data for an interface of a physical or virtual network device. For example, each node may represent an interface, a virtual channel or virtual private network (VPN) gateway (e.g., a tunnel).

The superposed singly linked list 10 is a superset of all the individual linked lists, e.g., lists 20-40. Neighboring nodes are linked by arcs called single-hop arcs that are applicable to all linked lists. Arcs that bypass or skip over one or more nodes are linked list specific and are called multi-hop arcs. Since the broadcast linked list is the superset, the broadcast linked list has no multi-hop arcs.

The Multi-Destination Group 1 list 20 comprises the sequence of node 1, node 3, node 4 and then node 5. The SP for Group 1 is node 1. List 20 skips over node 2, such that node 1 goes directly to node 3. That is, there is a multi-hop arc over node 2 in Group 1. List 20 ends with null or invalid node 22.

The Multi-Destination Group 2 list 30 comprises the sequence of node 2, node 3, and then node 4. Nodes 1 and 5 are not part of Group 2, and the SP for list 30 is node 2. List 30 ends with null or invalid node 32. There is a multi-hop arc over node 5 for Group 2.

The Multi-Destination Group 3 list 40 comprises the sequence node 1, node 2, node 3, and then node 5. List 40 ends with null or invalid node 42. Thus, there is a multi-hop arc over node 4 for Group 3.

According to the techniques presented, the multiple linked lists are integrated into a single compressed (superposed) link list, if the linked lists share common nodes. If every node in the linked lists represents an entry in a multi-destination expansion table (MET), then the MET is used much more efficiently with the compressed singly linked list as described herein.

Figure 2:
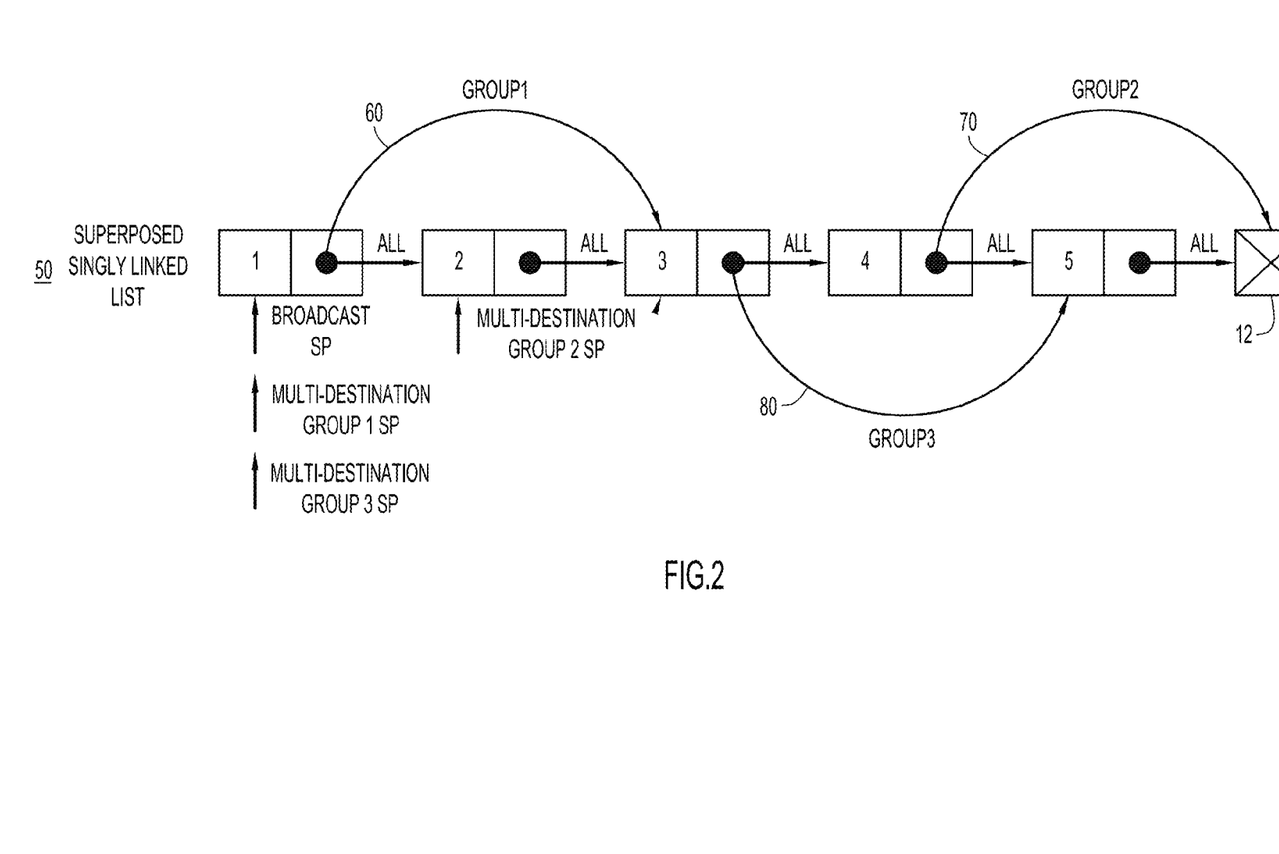
FIG. 2 is a diagram showing the compressed singly linked list for the example shown in FIG. 1.

An example of a compressed or superposed singly linked list for the example shown in FIG. 1 is shown at reference numeral 50 in FIG. 2. The superposed linked list 50 includes the same SPs for the various groups as those shown in FIG. 1. The default path through the superposed linked list 50 is shown as "All" in FIG. 2, and is node 1 to node 2 to node 3 to node 4 to node 5 to null node 12. However, there are group-specific multi-hop arcs in the linked list 50 to account for one or more nodes skipped over for a particular group. For example, FIG. 2 shows a group-specific arc 60 for Group 1 from node 1 to node 3, skipping over node 2 as required for the linked list for Group 1. Similarly, there is a group-specific arc 70 for Group 2 from node 4 to null node 12, skipping over node 5 as required for Group 2. There is also a group-specific arc 90 for Group 3 from node 3 to node 5, skipping over node 4 as required for Group 3. The superposed singly linked list 50 has 8 entries but can be used to account for all the singly linked lists 10-40 shown in FIG. 1, which would require 16 entries using convention MET techniques. This is a 50% improvement over conventional implementations. A substantial amount of storage space is saved, and when scaled for numerous linked lists of longer lengths, it is quite apparent how compressing multiple linked lists that share common nodes in this manner is much more efficient.

Figure 3:
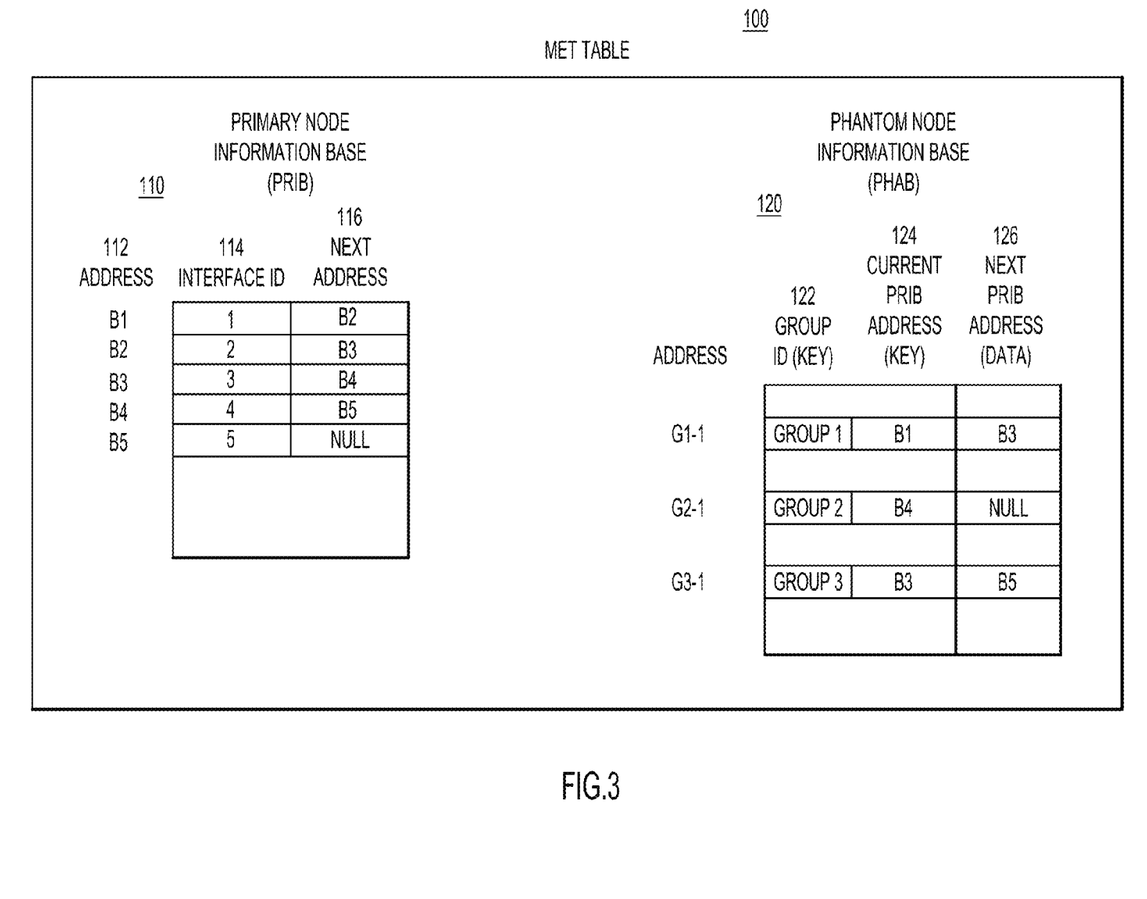
FIG. 3 is a diagram of a multi-destination expansion table used to create the compressed singly linked list according to the techniques presented herein.

Reference is now made to FIG. 3 for a description of a MET for the example shown in FIGS. 1 and 2. The MET, shown generally at reference numeral 100, comprises a first database 110 called a primary node information base (PRIB) and a second database 120 called a phantom node information base (PHAB). The PRIB 110 contains all the nodes in the superset (broadcast) singly linked list 10, and the default case for the direct sequential progression through the nodes in the singly linked list 10. The PRIB 110 has a column 112 for a current node address, a column 114 for a corresponding interface identifier (and/or data associated with an interface) of a physical or virtual network device, and a column for a next node address 116. For example, if the current node address is B1, which is assigned to interface ID 1, then the next node address is B2 (which is assigned to interface ID 2), and so on. In general, however, each entry in the PRIB 110 may be directly indexed and therefore the PRIB 110 simply include in each entry a next node address in the singly linked list given a current node address, but again, where interface data is associated with a node in the PRIB 110 for purposes of determining how to replicate a packet.

The PHAB 120 stores data that specifies the ways to move through the PRIB 110 in order to generate the different multi-destination groups. More specifically, the PHAB 120 is a database that specifies the multi-destination group-specific multi-hop arcs. Every entry in the PHAB 120 represents a group-specific multi-hop arc that skips or bypasses one or more nodes in the superset linked list. The PHAB 120 is more of a search database than a lookup database, whereas the PRIB 120 is a memory lookup database.

The PHAB 120 has fields for a search key and corresponding data. The search key may be based on a group identifier for a subset of a plurality of nodes in the superset singly linked list. In one example, however, there are two search key fields: one for the group ID shown at 122 and another for the current node address shown at 124. The data field is shown at reference numeral 126 and, again, contains data for the next node address (in the PRIB). Since the PHAB 120 only stores data for the multi-destination group-specific arcs, the data that the key maps to is the address of the node that the multi-hop arc is going to.

When replicating for a multi-destination group, the following general procedure is followed. The PHAB 120 is searched (using the key consisting of the group identifier and the current node address). If a hit is found in the PHAB 120, the results from the data field 126 in the PHAB 120 are used for the next node address. If a miss in the PHAB 120 occurs (there is no entry in the PHAB 120 for the search key), then the next node address is obtained from the PRIB 110.

Again, the PRIB 110 specifies the link list for the default scenario and the PHAB 120 specifies the exceptions for the multi-destination groups that are a subset of the superset specified in the PRIB 110. In the absence of a multi-hop arc at the given node, the linked list defaults to the primary linked list (defined in the PRIB 110). In other words, the primary linked list is the superset of all linked lists. In this way, primary nodes may be shared by all linked lists by default because they share the same single hop arc. As a result, duplication of common primary nodes may be avoided.

Using these techniques, the number of required MET entries is a function of the total number of multi-hop arcs in the superposed singly linked list, shown in FIG. 1. This outcome is the theoretical best for any group of linked lists sharing common nodes, and hence makes these techniques a highly scalable solution.

The following is an example. Consider Multi-Destination Group 2. The SP for Group 2 is node address B2 which corresponds to interface 2 and the packet is replicated to interface 2. This is set as the current node address. Using B2 as the current node address, the PRIB 110 indicates that the next node address, when the current node address is B2, is B3. Now, the PHAB 120 is searched using the search key consisting of Group 2 and the current node address B2. There is no match entry in the PHAB 120 for this search key, so the PRIB 110 wins, meaning the next node address is determined by what the PRIB 110 stores, which is node B3.

For the next iteration, the next node address B3 is set as the current node address. The packet is replicated to interface 3 corresponding to the current node address at this iteration, that is, B3. The PRIB 110 is searched using the current node address B3 and it is determined that the next node address is B4. The PHAB 120 is searched, using the search key consisting of Group 2 and current node address B3. There is no matching entry in the PHAB 120 for this search key, so the next node address is based on the PRIB 110, which indicates that the next node address is B4.

Again, for the next iteration, the next node address B4 is set to the current node address. A lookup is made in the PRIB 110 with B4 as the current node address and it is determined that the next node address is B5. The packet is replicated to interface 4, corresponding to current node address at this iteration, B4. The PHAB 120 is searched with the search key Group 2 and current node address B4. This time, there is a match/hit in the PHAB 120 for this search key. Therefore, the PHAB 120 determines what the next node address should be, not the PRIB 110, regardless of what the PRIB 110 indicates. The PHAB 120 indicates that for Group 2 and current node address B4, the next node address is the null node, i.e., the link list is terminated. Thus, node B5 in the superset linked list is skipped over, as is consistent with the linked list 30 shown in FIG. 1. The linked list of nodes is traversed in this manner for the Multi-Destination Group 2, and at each iteration, the packet is replicated to an interface represented by the node that is traversed, i.e., first the interface corresponding to node 2, then an interface corresponding to node 3 and finally an interface corresponding to node 4. Thus, the linked list is "walked" through to serially replicate packets on multiple interfaces.

Figure 4:
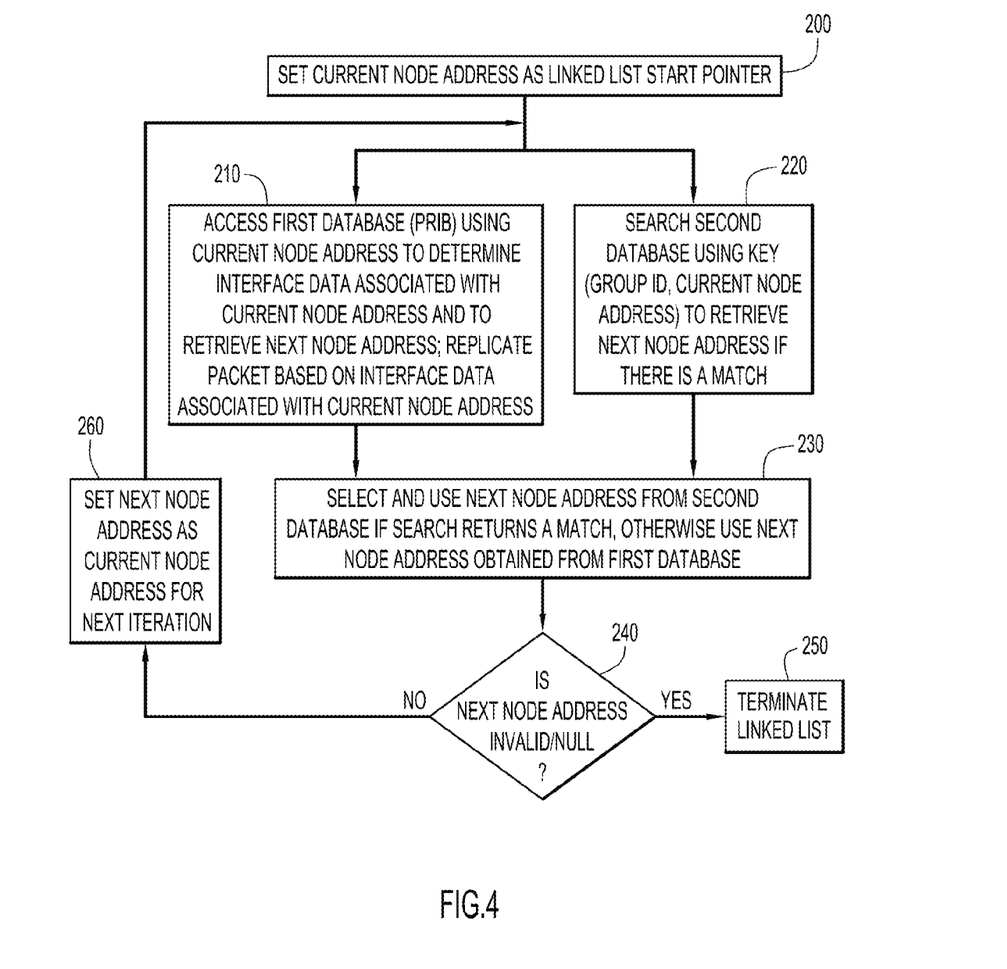
FIG. 4 is a flow chart showing examples of operations performed according to the techniques presented herein to generate a compressed singly linked list.

Reference is now made to FIG. 4 which depicts a flow chart for the operations described above in connection with FIGS. 1-3. These operations would be performed in or on behalf of a physical or virtual network device for purposes of determining how to replicate packets for multi-destination groups. At 200, the linked list start pointer (SP) is set to the current node address for a particular multi-destination group. At 210, the first database (the PRIB) is accessed using the current node address to determine interface data associated with the current node address for purposes of replicating the packet and to retrieve the next node address. At this time, the packet may be replicated to an interface corresponding to the current node address. Actually, at any time after accessing the PRIB at 210 and prior to the next iteration (at operation 260) the packet may be replicated based on interface data stored in the PRIB for the current node address. Furthermore, there may be logic executed after PRIB lookup and before packet replication for various additional functions, such as load-balancing.

At 220, the second database (the PHAB) is searched using the search key (Group ID and current node address) to determine whether there is a match/hit. The operations 210 and 220 may be performed in series or in parallel. Performing them in parallel is more time efficient. At 230, the next node address from the second database (PHAB) is selected and used if the search of the PHAB returns a match, otherwise the next node address obtained from first database (PRIB) is used. At 240, it is determined whether the next node address corresponds to a null or invalid node, and if so, then at 250 the link list is terminated/done. At 260, the next node address is set to the current node address for the next iteration. Operations 210, 220, 230, 240, and 260 are performed again until the null/invalid node is reached, at which point the link list is done. A packet is replicated based on interface data stored in the PRIB for each node that is traversed during each iteration of operations 210-250.

Thus, in one more, a method is provided for iteratively replicating packets when expanding a multi-destination group, the method comprising: storing a multi-destination expansion table comprising a first database containing data representing all nodes in a singly linked list that is a superset of nodes for a plurality of multi-destination groups, each node representing an interface of a physical or virtual network device and each entry in the first database comprising interface data associated with a current node address and an address for a next node in the singly linked list, and a second database storing data representing multi-destination group specific arcs bypassing one or more nodes in the first database; and traversing the singly linked list to determine how to replicate a packet for a particular multi-destination group by: accessing the first database using a current node address to determine a next node address and to determine interface data associated with the current node address; replicating the packet based on interface data stored in the first database associated with the current node address; searching the second database using a key based on a group identifier for a subset of the plurality of nodes in the singly linked list to determine whether a match to the key exists in the second database; and when a match is found in the second database, determining a next node address for a node in the first database from a matching entry to the key in the second database and when a match is not found in the second database, determining a next node address for a node in the first database obtained from accessing the first database.

Figure 5:
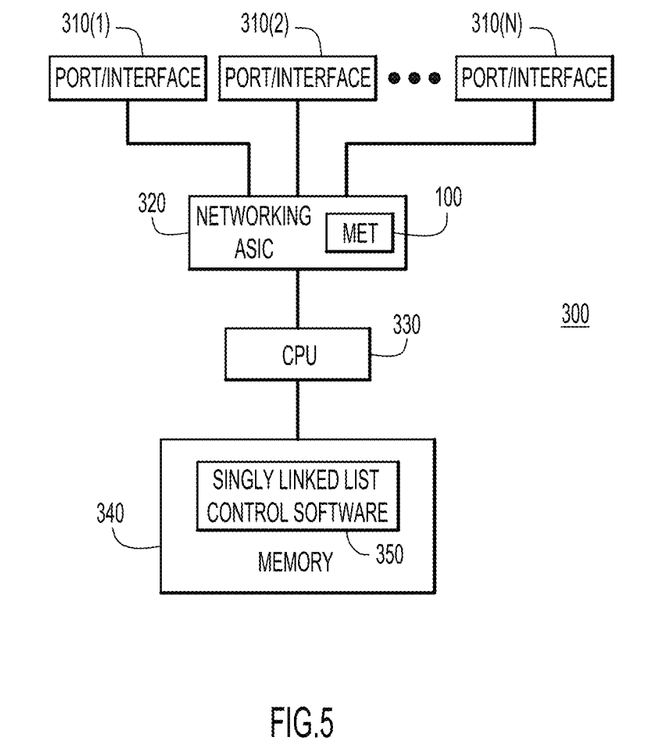
FIG. 5 is a block diagram of an example network device in which the techniques presented herein may be used to replicate packets.

Turning now to FIG. 5, a block diagram is shown of an example of a network device in which or for which the techniques presented herein may be used. If the network device is a virtual network device, then the components shown in FIG. 5 would be implemented/emulated in software running in a computing device in software. The network device 300 includes a plurality of ports/interfaces 310(1)-310(N), one or more networking application specific integrated circuits (ASICs) 320, a central processing unit (CPU) 330 and memory 340. The ASIC 320 is a switch ASIC, router ASIC, or gateway ASIC depending on the function of the network device, and contains the logic to evaluate parameters of packets received on one of the ports/interfaces 310(1)-310(N) and to determine how to direct them, if appropriate, out from another port/interface. The MET 100 (shown in FIG. 3) may be included or configured in the ASIC 320 for purposes of assisting in the routing decision for multi-destination groups. Alternatively, the MET 100 may be stored in the memory 340. The memory 340 may also store instructions for singly linked list control software 350. When executed by the CPU 330, the singly linked list control software 350 causes the CPU 330 to assist the ASIC, or entirely perform, the operations presented herein in connection with FIGS. 1-4. In other words, the operations described herein may be performed entirely in hardware or entirely in software/firmware.

The memory 340 may comprise read only memory (ROM), random access memory (RAM), magnetic disk storage media devices, optical storage media devices, flash memory devices, electrical, optical, or other physical/tangible memory storage devices. In general, the memory 340 may comprise one or more tangible (non-transitory) computer readable storage media (e.g., a memory device) encoded with software comprising computer executable instructions and when the software is executed (by the CPU 330) it is operable to perform the operations described herein.

Thus, as depicted in FIG. 5, in one form, an apparatus is provided comprising: a plurality of interfaces on which packets sent in a network are received and sent out; a networking application specific integrated circuit configured to direct packets to one of the plurality of interfaces; and a central processing unit coupled to the networking application specific integrated circuit. The networking application specific integrated circuit or the central processing unit is configured to: store a multi-destination expansion table comprising a first database containing data representing all nodes in a singly linked list that is a superset of nodes for a plurality of multi-destination groups, each node representing an interface of a physical or virtual network device and each entry in the first database comprising interface data associated with a current node address and an address for a next node in the singly linked list, and a second database storing data representing multi-destination group specific arcs bypassing one or more nodes in the first database; traverse the singly linked list to determine how to replicate a packet for a particular multi-destination group by: accessing the first database using a current node address to determine a next node address and to determine interface data associated with the current node address; replicating the packet based on interface data stored in the first database associated with the current node address; searching the second database using a key based on a group identifier for a subset of the plurality of nodes in the singly linked list to determine whether a match to the key exists in the second database; and when a match is found in the second database, determine a next node address for a node in the first database from a matching entry to the key in the second database and when a match is not found in the second database, determine a next node address for a node in the first database obtained from accessing the first database.

In another form, provided herein is one or more computer readable storage media encoded with software comprising computer executable instructions and when the software is executed operable to: in a network device, store a multi-destination expansion table comprising a first database containing data representing all nodes in a singly linked list that is a superset of nodes for a plurality of multi-destination groups, each node representing an interface of a physical or virtual network device and each entry in the first database comprising interface data associated with a current node address and an address for a next node in the singly linked list, and a second database storing data representing multi-destination group specific arcs bypassing one or more nodes in the first database; traverse the singly linked list to determine how to replicate a packet for a particular multi-destination group by: accessing the first database using a current node address to determine a next node address for and to determine interface data associated with the current node address; replicating the packet based on interface data stored in the first database associated with the current node address; searching the second database using a key based on a group identifier for a subset of the plurality of nodes in the singly linked list to determine whether a match to the key exists in the second database; and when a match is found in the second database, determining a next node address for a node in the first database from a matching entry to the key in the second database and when a match is not found in the second database, determining a next node address for a node in the first database obtained from accessing the first database.

Figure 6:
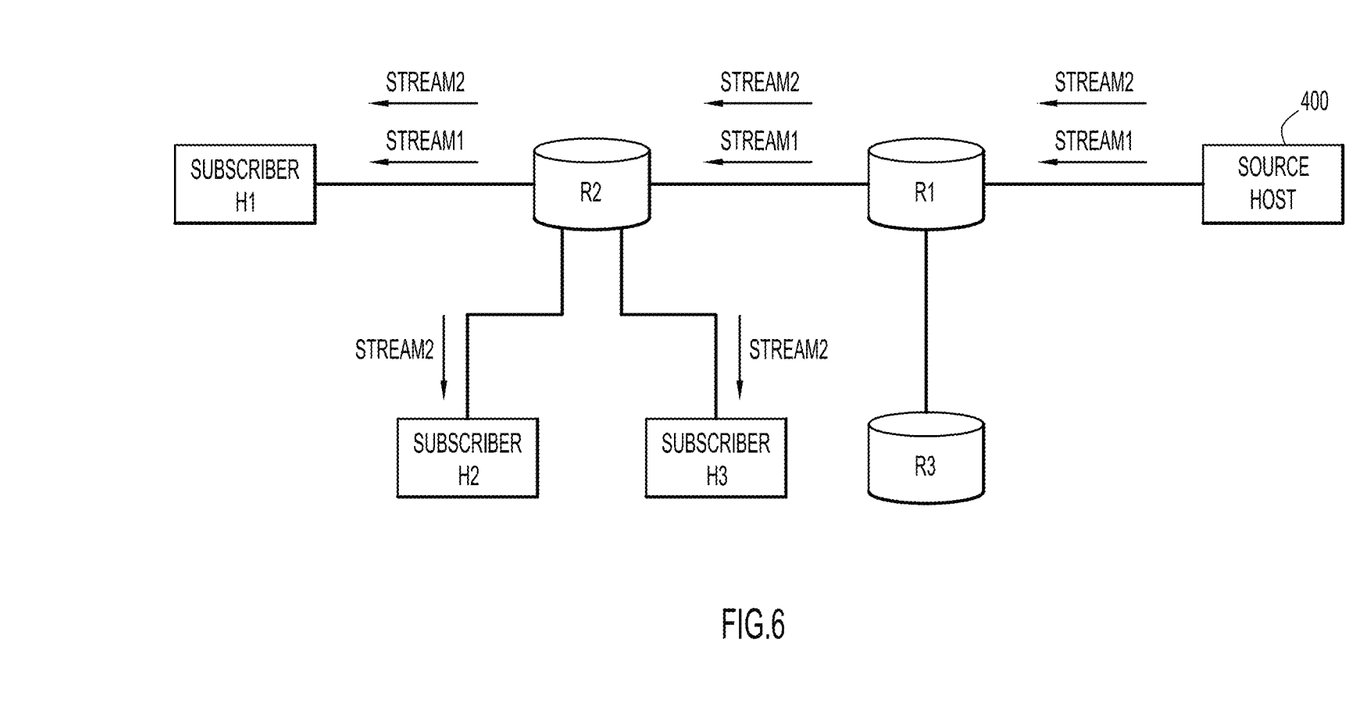
FIGS. 6-8 illustrate examples of applications of the linked list compression techniques presented herein.
Figure 7:
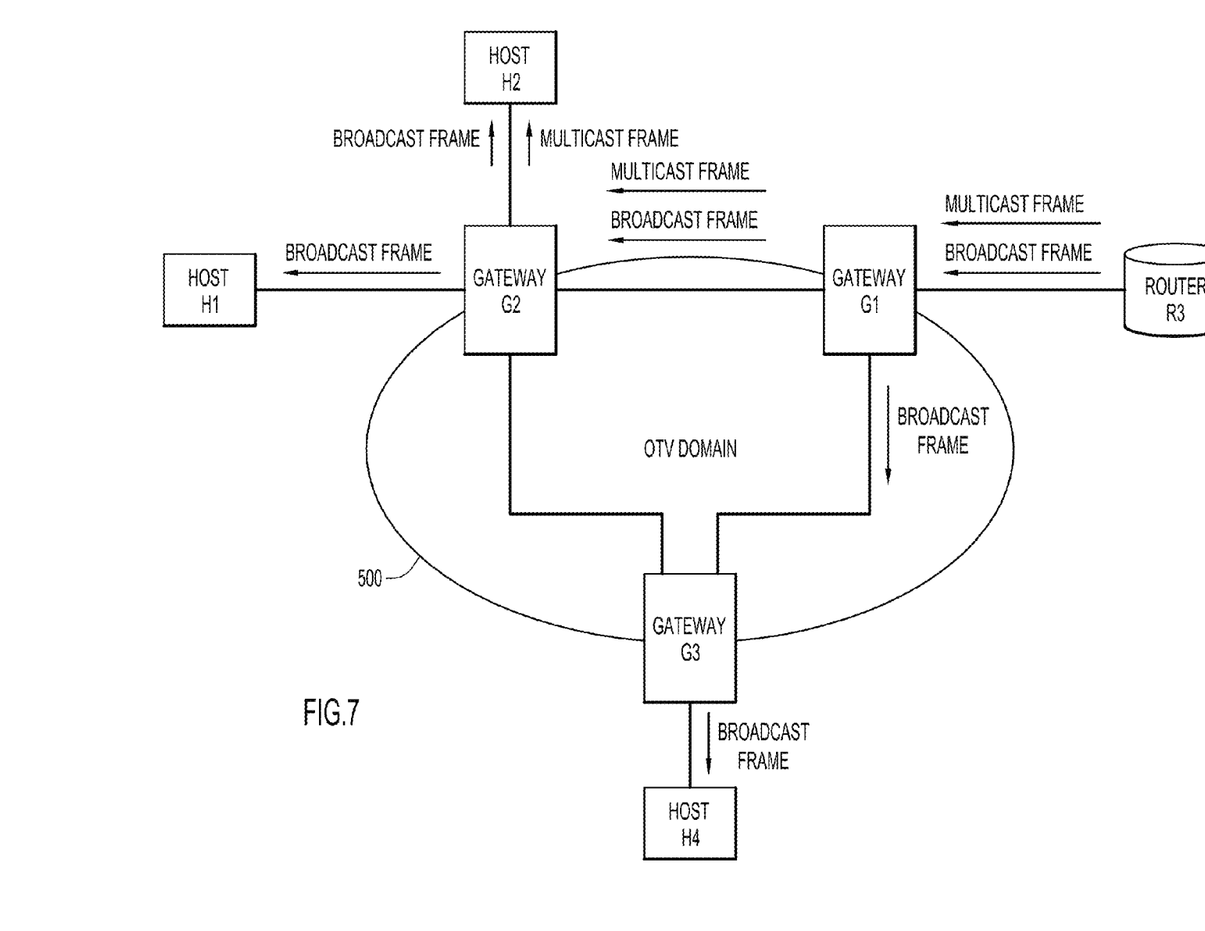
Figure 8:
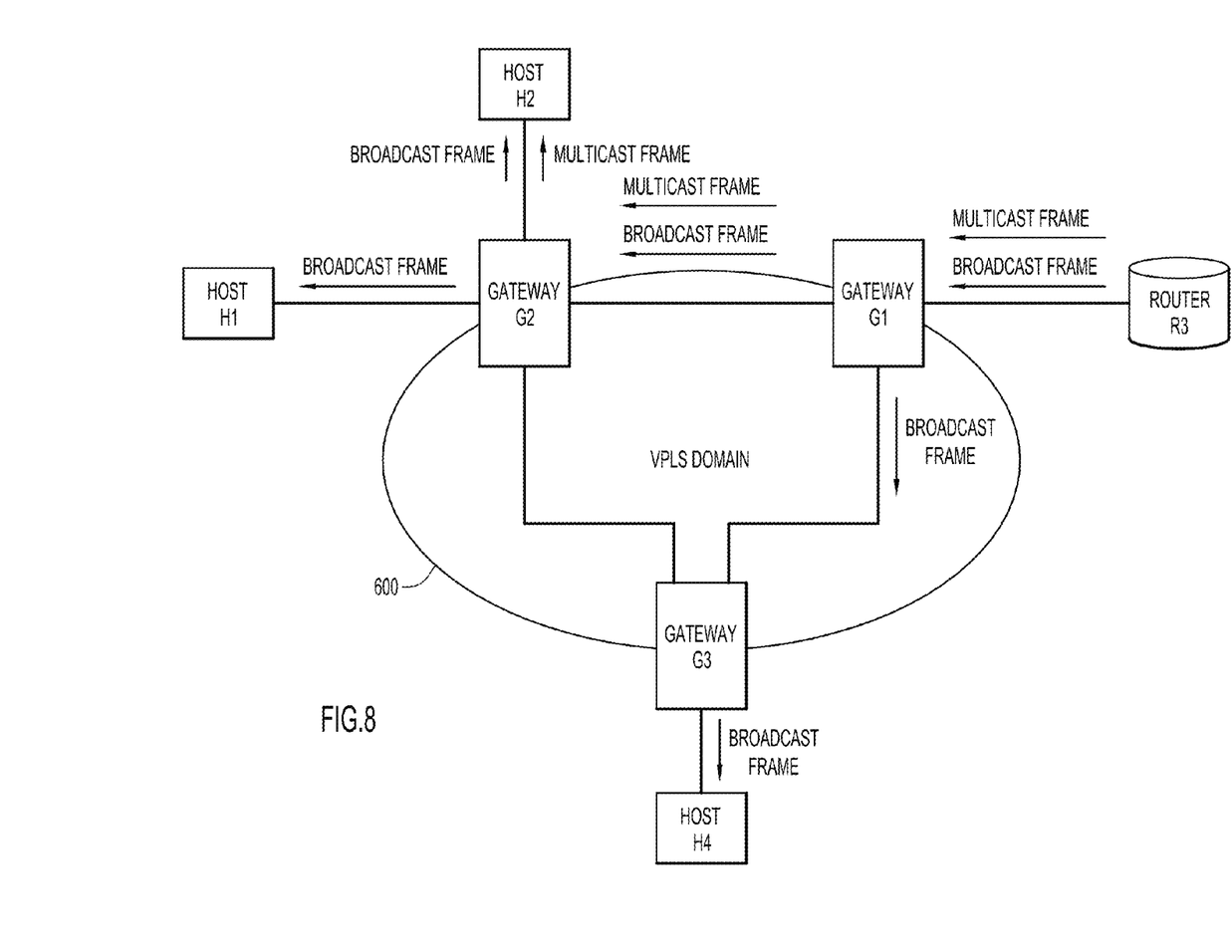

Turning now to FIGS. 6-8, examples of applications of the techniques presented herein are now described. Referring first to FIG. 6, an Internet Protocol (IP) Multicast example is shown. In this example, the superset is a Layer 3 (L3) group and the subset is a L3 group (without tunneling). Traditionally, MET expansion is used for IP multicast replication. Source host 400 distributes data stream 1 to subscriber H1 via IP multicast group 1. Router R1 is the first hop router with respect to source host 400, and router R2 is downstream from router R1. Router R3 is shown for completeness, but not involved in this example. Source host 400 distributes data stream 2 to subscribers H1, H2 and H3 via IP multicast group 2. An IP Multicast tree may be a pruned subset of another IP multicast tree or IP multicast trees may overlap. In this case, router R2 may use a single linked list to selectively replicate packets on IP multicast groups 1 and 2, using the techniques presented herein.

Turning to FIG. 7, an IP multicast tunneling example is shown. In this example, the superset is a Layer 3 (L3) group and the subset is an L3 group (with tunneling). Some Layer 2 (L2) virtual private network (VPN) technology like Over-the-top Virtualization (OTV) creates one IP multicast group for flooding and one IP multicast group for multicast. An OTV domain is shown at 500. Router R3 sends a broadcast packet that needs to reach hosts H1, H2 and H4. Gateway G1 sends packets on IP multicast group 1 in the OTV domain 500 in order to reach gateways G2 and G3. Router R3 sends a multicast packet that needs to reach host H2. IP multicast group 2 is created in the OTV domain that fans out to gateway G2 only. The multicast group is a pruned subset of the broadcast group. Gateway G1 only needs to send packets to gateway G2, and does not need to send packets to gateway G3. IP multicast group 1 is a pruned subset of IP multicast group 2. In this case, gateway G1 may use a single linked list to selectively replicate packets on IP multicast groups 1 and 2.

FIG. 8 illustrates an example of L2 multicast tunneling. In this example, the superset is a L2 group and a subset is an L2 group. Some L2 VPN technology like Virtual Private LAN Service (VPLS) requires replicating customer frames on point-to-point tunnel/pseudowire connections. In computer networking and telecommunications, a pseudowire (or pseudo-wire) is an emulation of a point-to-point connection over a network. The pseudowire emulates the operation of a "transparent wire" carrying the service. The service may be Asynchronous Transfer Mode (ATM), Frame Relay, Ethernet or time-division multiplexing (TDM) while the packet network may be Multi-protocol Label Switching (MPLS), Internet Protocol (IPv4 or IPv6), or Layer 2 Tunneling Protocol Version 3 (L2TPv3). VPLS is a way to provide Ethernet based multipoint-to-multipoint communication over IP/Multi-Protocol Label Switching (MPLS) networks.

Router R3 sends a broadcast packet that needs to reach hosts H1, H2 and H4. Gateway G1 needs to replicate packet on pseudowires to G2 and G3. Router R3 sends a multicast packet that needs to reach host H2. A multicast group is a pruned subset of the broadcast group. Gateway G1 only needs to send packet on pseudowire to gateway G2, and does not need to send packets on pseudowire to G3. L2 multicast trees are a pruned subset of L2 broadcast tree. In this case, gateway G1 may use a single linked list to selectively replicate packets on the L2 multicast group and the L2 broadcast group.

The shared singly linked list compression method presented herein offers several advantages. First, it maximizes resource utilization. Compression allows for greater capacity given the same resource. These techniques achieve the theoretical best compression of a group of singly linked lists with common nodes, and may be applied to multi-destination group expansion in a MET as well as any other network applications that involve linked lists.

Second, these techniques are highly scalable. The MET grows sub-linearly with the total number of linked list nodes. By traversing any singly linked list along the superposed singly linked list, the theoretical best compression is achieved for a group of singly linked lists with common nodes, successfully avoiding unnecessary duplication of any nodes or arcs. This allows for scaling better than any existing solutions, as the number of linked lists increases and the size of each linked list increases. Compute performance is unaffected even as it is scaled to millions of singly linked lists.

Third, it is very flexible. There are no limitations on the number of next-hop node addresses. There is no required number of linked lists in the group to be predetermined. Thus, a linked list may be dynamically added or removed from the superposed linked list.

Many network switches suffer from overcapacity in the MET in order to support multiple singly linked lists that belong to the same superset. These techniques can provide scalability, flexibility and full MET utilization.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method for iteratively replicating packets when expanding a multi-destination group, the method comprising:

in a network device including a plurality of interfaces on which packets sent in a network are received and sent out:

storing a multi-destination expansion table comprising a first database containing data representing multiple singly linked lists that represent respective ones of multiple multi-destination groups of nodes compressed into a single singly linked list that is a superset of all nodes for the multiple multi-destination groups, each node representing an interface of a physical or virtual network device and each entry in the single singly linked list of the first database comprising interface data associated with a current node address and an address for a next node in the single singly linked list, and a second database storing data representing multi-destination group specific arcs bypassing one or more nodes in the single singly linked list of the first database;

receiving from the network at one of the plurality of interfaces of the network device a packet destined for one or more multi-destination groups; and traversing the single singly linked list to determine how to replicate the packet for each multi-destination group, the traversing for a particular multi-destination group including:

accessing the single singly linked list in the first database using a current node address to determine a next node address and to determine interface data associated with the current node address;

replicating the packet based on interface data stored in the single singly linked list of the first database associated with the current node address, the replicating comprising:

searching the second database using a key based on a group identifier for a subset of the plurality of nodes in the single singly linked list to determine whether a match to the key exists in the second database; and when a match is found in the second database, determining a next node address for a node in the single singly linked list of the first database from a matching entry to the key in the second database and when a match is not found in the second database, determining a next node address for a node in the single singly linked list of the first database obtained from accessing the single singly linked list of the first database; and sending each replicated packet to the network from a corresponding one of the plurality of network interfaces of the network device.

2. The method of claim 1, wherein each entry in the second database comprises a key field and a data field, the key field for a current node address and the data field comprising data for a next node address.

3. The method of claim 2, wherein searching comprises searching the second database using the group identifier for the particular multi-destination group and the current node address to search against first and second key fields, respectively, to determine whether there is a match to an entry in the second database, and when there is a match, retrieving the next node address stored in the data field for the matching entry in the second database.

4. The method of claim 3, further comprising after each iteration of accessing the first database, searching the second database and determining a next node address in the single singly linked list for the particular multi-destination group, setting the next node address as the current node address for a next iteration of accessing the first database, searching the second database, and determining a next node address.

5. The method of claim 4, further comprising terminating traversing of the single singly linked list when the next node address is determined to be invalid or null.

6. The method of claim 1, wherein searching comprises searching based on a group identifier for a multi-destination group that comprises a subset of the plurality of nodes.

7. The method of claim 1, wherein the single singly linked list refers to destinations of a Layer 2 (L2) broadcast group and each multi-destination group is an L2 group that is a subset of the L2 broadcast group.

8. The method of claim 1, wherein the single singly linked list refers to destinations of a Layer 3 (L3) multicast group and each multi-destination group is an L2 group that is a subset of the L3 multicast group.

9. The method of claim 1, wherein the single singly linked list refers to destinations of a Layer 3 (L3) broadcast group and each multi-destination group is an L3 group that is a subset of the L3 broadcast group.

10. An apparatus comprising:

a plurality of interfaces on which packets sent in a network are received and sent out;

a networking application specific integrated circuit configured to direct packets to one of the plurality of interfaces; and a central processing unit coupled to the networking application specific integrated circuit;

wherein the networking application specific integrated circuit or the central processing unit is configured to:

store a multi-destination expansion table comprising a first database containing data representing multiple singly linked lists that represent respective ones of multiple multi-destination groups of nodes compressed into a single singly linked list that is a superset of all nodes for the multiple multi-destination groups, each node representing an interface of a physical or virtual network device and each entry in the single singly linked list of the first database comprising interface data associated with a current node address and an address for a next node in the single singly linked list, and a second database storing data representing multi-destination group specific arcs bypassing one or more nodes in the single singly linked list of the first database;

receive from the network at one of the plurality of interfaces a packet destined for one or more multi-destination groups; and traverse the single singly linked list to determine how to replicate the packet for each multi-destination group, wherein a traversal for a particular multi-destination group includes:

accessing the single singly linked list in the first database using a current node address to determine a next node address and to determine interface data associated with the current node address;

replicating the packet based on interface data stored in the single singly linked list of the first database associated with the current node address, the replicating comprising;

searching the second database using a key based on a group identifier for a subset of the plurality of nodes in the single singly linked list to determine whether a match to the key exists in the second database; and when a match is found in the second database, determine a next node address for a node in the single singly linked list of the first database from a matching entry to the key in the second database and when a match is not found in the second database, determine a next node address for a node in the single singly linked list of the first database obtained from accessing the single singly linked list of the first database; and send each replicated packet to the network from a corresponding one of the plurality of network interfaces.

11. The apparatus of claim 10, wherein the networking application specific integrated circuit or the central processing unit is configured to search the second database using the group identifier for the particular multi-destination group and the current node address to search against first and second key fields, respectively, to determine whether there is a match to an entry in the second database, and when there is a match, retrieving the next node address stored in the data field for the matching entry in the second database.

12. The apparatus of claim 11, wherein the networking application specific integrated circuit or the central processing unit is configured to, after each iteration of accessing the first database, searching the second database and determining a next node address in the single singly linked list for the particular multi-destination group, set the next node address as the current node address for a next iteration of accessing the first database, searching the second database, and determining a next node address.

13. The apparatus of claim 12, wherein the networking application specific integrated circuit or the central processing unit is configured to terminate traversing of the single singly linked list when the next node address is determined to be invalid or null.

14. The apparatus of claim 10, wherein the networking application specific integrated circuit or the central processing unit is configured to search based on a group identifier for a multi-destination group that comprises a subset of the plurality of nodes.

15. One or more non-transitory computer readable storage media encoded with software comprising computer executable instructions and when the software is executed operable to:

in a network device including a plurality of interfaces on which packets sent in a network are received and sent out, store a multi-destination expansion table comprising a first database containing data representing multiple singly linked lists that represent respective ones of multiple multi-destination groups of nodes compressed into a single singly linked list that is a superset of all nodes for the multiple multi-destination groups, each node representing an interface of a physical or virtual network device and each entry in the single singly linked list of the first database comprising interface data associated with a current node address and an address for a next node in the single singly linked list, and a second database storing data representing multi-destination group specific arcs bypassing one or more nodes in the single singly linked list of the first database;

receive from the network at one of the plurality of interfaces of the network device a packet destined for one or more multi-destination groups; and traverse the single singly linked list to determine how to replicate the packet for each multi-destination group, wherein a traversal for a particular multi-destination group includes:

accessing the single singly linked list in the first database using a current node address to determine a next node address and to determine interface data associated with the current node address;

replicating the packet based on interface data stored in the single singly linked list of the first database associated with the current node address, the replicating comprising:

searching the second database using a key based on a group identifier for a subset of the plurality of nodes in the single singly linked list to determine whether a match to the key exists in the second database; and when a match is found in the second database, determine a next node address for a node in the single singly linked list of the first database from a matching entry to the key in the second database and when a match is not found in the second database, determine a next node address for a node in the single singly linked list of the first database obtained from accessing the single singly linked list of the first database; and send each replicated packet to the network from a corresponding one of the plurality of network interfaces of the network device.

16. The computer readable storage media of claim 15, wherein the instructions operable to search comprise instructions operable to search the second database using the group identifier for the particular multi-destination group and the current node address to search against first and second key fields, respectively, to determine whether there is a match to an entry in the second database, and when there is a match, retrieving the next node address stored in the data field for the matching entry in the second database.

17. The computer readable storage media of claim 16, further comprising instructions operable to, after each iteration of accessing the first database, searching the second database and determining a next node address in the single singly linked list for the particular multi-destination group, set the next node address as the current node address for a next iteration of accessing the first database, searching the second database, and determining a next node address.

18. The computer readable storage media of claim 17, further comprising instructions operable to terminate traversing of the single singly linked list when the next node address is determined to be invalid or null.

19. The computer readable storage media of claim 15, wherein the instructions operable for searching comprise instructions operable for searching based on a group identifier for a multi-destination group that comprises a subset of the plurality of nodes.

20. The computer readable storage media of claim 15, wherein the wherein the single singly linked list refers to destinations of a Layer 2 (L2) broadcast group and each multi-destination group is an L2 group that is a subset of the L2 broadcast group.

21. The method of claim 1, wherein the single singly linked list defines a default path through all of the nodes in the multiple multi-destination groups and superposes instances of nodes that are common across the multi-destination groups into a single node of the singly linked list.

* * * * *